United States Patent
Morishita et al.

(10) Patent No.: US 8,348,003 B2
(45) Date of Patent: Jan. 8, 2013

(54) OCCUPANT DETECTION CORRECTION SYSTEM

(75) Inventors: Kentaro Morishita, Nagoya (JP); Yosuke Kubota, Toyota (JP); Isao Hagiwara, Nagoya (JP); Koki Terashima, Chiryu (JP); Muneto Inayoshi, Nagoya (JP)

(73) Assignees: Toyota Jidosha Kabushiki Kaisha, Toyota (JP); Aisin Seiki Kabushiki Kaisha, Kanya-Shi (JP)

( * ) Notice: Subject to any disclaimer, the term of this patent is extended or adjusted under 35 U.S.C. 154(b) by 0 days.

(21) Appl. No.: 13/401,095

(22) Filed: Feb. 21, 2012

(65) Prior Publication Data

US 2012/0211296 A1    Aug. 23, 2012

(30) Foreign Application Priority Data

Feb. 21, 2011    (JP) ................................ 2011-034820

(51) Int. Cl.
B60K 28/00    (2006.01)
(52) U.S. Cl. ........................... 180/273; 280/735; 701/45
(58) Field of Classification Search .................. 280/735; 180/273; 701/36, 45
See application file for complete search history.

(56) References Cited

U.S. PATENT DOCUMENTS

| | | | | |
|---|---|---|---|---|
| 5,670,853 A * | 9/1997 | Bauer | ............................ | 318/286 |
| 5,882,084 A * | 3/1999 | Verellen et al. | ................ | 297/478 |
| 6,213,510 B1 * | 4/2001 | Suyama | ........................ | 280/805 |
| 6,629,575 B2 * | 10/2003 | Nikolov | ........................ | 180/282 |
| 6,949,904 B2 * | 9/2005 | Rumney | ........................ | 318/565 |
| 7,098,674 B2 * | 8/2006 | Stanley et al. | ................. | 324/662 |
| 7,607,511 B2 * | 10/2009 | Sunabashiri | .................. | 180/282 |
| 2007/0018439 A1 * | 1/2007 | Sunabashiri | ............... | 280/730.1 |

FOREIGN PATENT DOCUMENTS

JP    A-2000-203324    7/2000

* cited by examiner

*Primary Examiner* — Toan To
(74) *Attorney, Agent, or Firm* — Oliff & Berridge, PLC (57) ABSTRACT

There is provided an occupant detection correction system including: a load detection section that detects load imparted to a vehicle seat and outputs a load signal representing the load; an occupant detection section that detects an occupant based on the load signal and is capable of resetting the load signal to a reference point based on a predetermined reset instruction; a tilt angle detection section that detects a predetermined tilt angle of a seatback; and a permitting section that permits execution of resetting the load signal to the reference point by the occupant detection section when the predetermined tilt angle is detected by the tilt angle detection section.

4 Claims, 6 Drawing Sheets

OCCUPANT DETECTION CORRECTION SYSTEM

CROSS-REFERENCE TO RELATED APPLICATION

This application is based on and claims priority under 35 USC 119 from Japanese Patent Application No. 2011-034820 filed on Feb. 21, 2011, the disclosure of which is incorporated by reference herein.

BACKGROUND

1. Technical Field

The present invention relates to an occupant detection correction system, and in particular to an occupant detection correction system for correcting an occupant detection device for detecting an occupant seated in a vehicle seat.

2. Related Art

Technology described in Japanese Patent Application Laid-Open (JP-A) No. 2000-203324 is proposed as an example of an occupant detection device provided to a seat in a vehicle.

The occupant detection device described in JP-A No. 2000-203324 is provided with sensors, such as two distortion measuring load cells at a rear portion of a seat cushion, and is configured to detect seating of an occupant by detecting load imparted to the seat with the sensors.

However, in an occupant detection device such as that of the technology described in JP-A No. 2000-203324 configured to detect seating of an occupant by detecting load imparted with two sensors provided at a rear portion of a seat cushion, since the load imparted to sensors provided at the rear portion of a seat cushion varies with the seatback angle, an operative who is resetting the reference point for load signals on factory shipment needs to do so at a predetermined reclining upright state (standard state).

SUMMARY

In consideration of the above circumstances the present invention provides an occupant detection correction system enabling an operative to reliably and appropriately reset a load signal to a reference point.

A first aspect of the present invention provides an occupant detection correction system including:

a load detection section that detects load imparted to a vehicle seat and outputs a load signal representing the load;

an occupant detection section that detects an occupant based on the load signal and is capable of resetting the load signal to a reference point based on a predetermined reset instruction;

a tilt angle detection section that detects a predetermined tilt angle of a seatback; and a permitting section that permits execution of resetting the load signal to the reference point by the occupant detection section when the predetermined tilt angle is detected by the tilt angle detection section.

According to the first aspect of the present invention, the load detection section detects load imparted to a vehicle seat and outputs a load signal representing the detected load.

The occupant detection section thereby detects an occupant based on the load signal. It is necessary to perform resetting of the load signal output from the load detection section to a reference point (for example zero), Namely, since the load imparted to a seat changes with the tilt angle of the seatback, accurate occupant determination can sometimes no longer be performed depending on the angle of the seatback when the load signal is reset to the reference point.

The tilt angle detection section detects a predetermined tilt angle of a seatback, and the permitting section permits execution of resetting of the load signal to the reference point by the occupant detection section when the predetermined tilt angle has been detected by the tilt angle detection section. Namely, resetting of the load signal to the reference point can be reliably and appropriately performed since resetting of the load sensors to the reference point is performed when the seatback angle is at the predetermined angle.

A second aspect of the present invention provides the occupant detection correction system of the first aspect, further including:

a sliding position detection section that detects a sliding position of the vehicle seat; and a headrest position detection section that detects a position of a headrest, wherein the permitting section permits resetting to the reference point when the state of the vehicle seat is detected to be a specific state based the predetermined tilt angle being detected by the tilt angle detection section, and the detection results of the sliding position detection section and the headrest position detection section.

A third aspect of the present invention provides the occupant detection correction system of the first aspect, wherein the permitting section is provided separately to a vehicle, and permits execution of resetting to the reference point by outputting a reset instruction to the occupant detection section when the predetermined tilt angle is by the tilt angle detection section.

A fourth aspect of the present invention provides the occupant detection correction system of the first aspect, wherein the load detection section is provided at two locations at the vehicle rear-side of the seat cushion and detects load imparted to the rear side of the vehicle seat.

According to the present invention as explained above, an advantageous effect can be obtained such that an operative can reliably and appropriately reset a load signal to a reference point by providing a configuration permitting a load detection section to reset to the reference point when a seatback is at a predetermined tilt angle.

BRIEF DESCRIPTION OF THE DRAWINGS

Exemplary embodiments of the present invention will be described in detail based on the following figures, wherein.

DETAILED DESCRIPTION

Detailed explanation follows regarding an exemplary embodiment of the present invention, with reference to the drawings.

First Exemplary Embodiment

Figure 1:
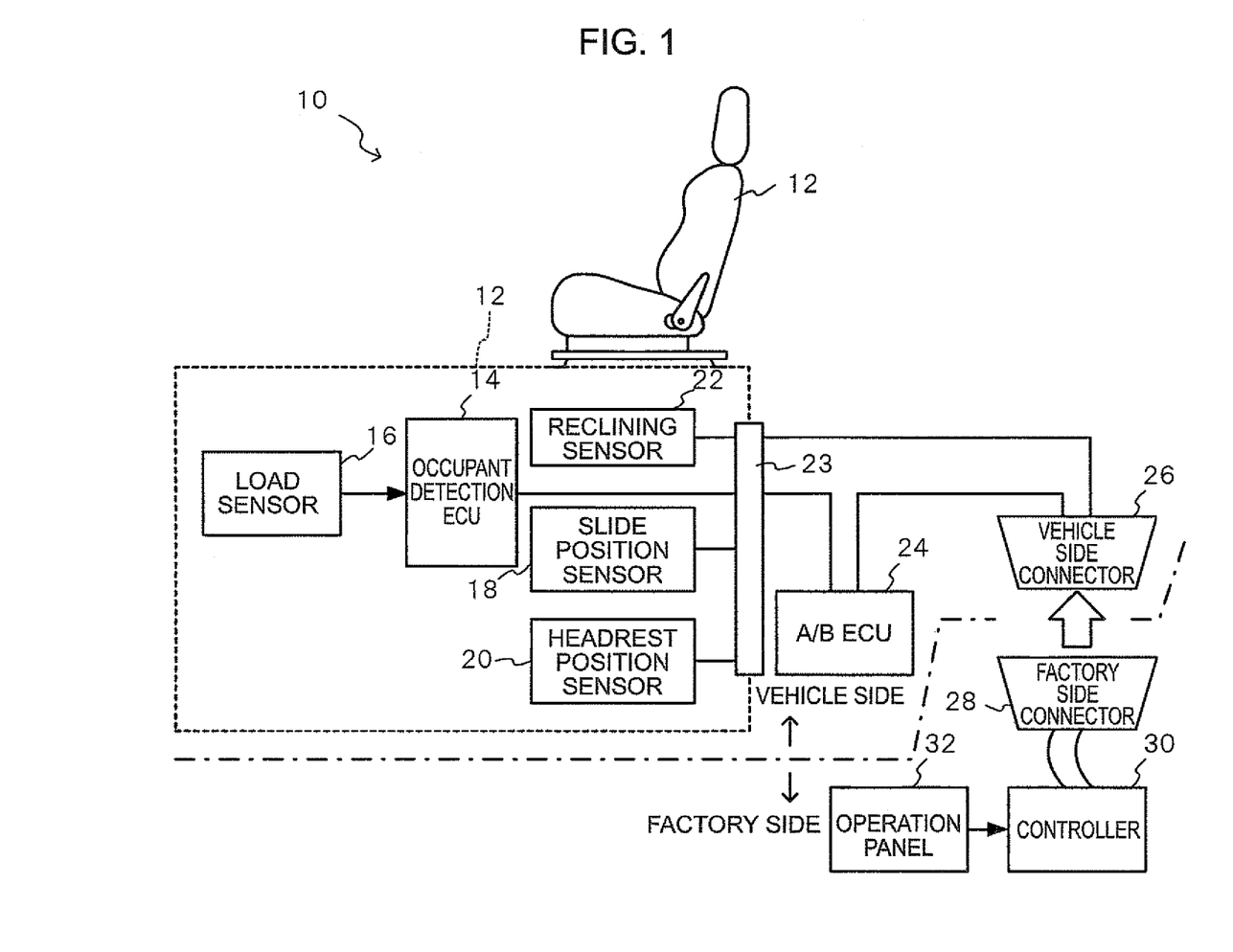
FIG. 1 is a diagram illustrating a schematic configuration of an occupant detection correction system according to a first exemplary embodiment of the present invention.

FIG. 1 is a diagram illustrating a schematic configuration of an occupant detection correction system according to a first exemplary embodiment of the present invention. An occupant detection correction system 10 is a system for correcting a load signal for input to an occupant detection ECU 14 for detecting a seated occupant on a seat 12 provided in a vehicle.

The seat 12 is provided with: load sensors 16 for detecting load provided on the left and right at two locations on the rear side of a seat cushion of the seat 12; a slide position sensor 18 for detecting a seat sliding position; a headrest position sensor 20 for detecting the position of a headrest; and a reclining sensor 22 for detecting a predetermined tilt angle (reclining upright state) in which the seatback is in an upright state. The reclining upright state may, for example, be appropriately set as a state in which a seatback is at its most upright in a state where a lock maintains the tilt angle of the seatback.

The occupant detection ECU 14 for performing processing to detect the presence of a seated occupant or an object on the seat 12 is provided at a lower portion of the seat 12. The load sensors 16 are connected to the occupant detection ECU 14. The occupant detection ECU 14 is configured to detect the presence of a seated occupant or an object based on detection results (load signals) of the load sensors 16.

An A/B ECU 24 for controlling an airbag is connected to the occupant detection ECU 14 through a connector 23. The A/B ECU 24 is configured to determine, based on the detection results of the occupant detection ECU 14, whether or not to deploy an airbag according to whether there is a seated occupant present and whether any seated occupant is an adult or child. For example, based on the detection results of the occupant detection ECU 14, the A/B ECU 24 performs control to prevent an airbag device from being deployed when there is no seated occupant, to deploy the airbag device when there is a seated adult, and to prevent the airbag device from being deployed when there is a seated child.

The occupant detection ECU 14 detects the presence of a seated occupant or an object on the seat 12 based on the detection results of the load sensors 16. However occupant detection needs to be performed after the detection results (load signals) of the load sensors 16 have been zero point reset. A controller 30 is provided on the factory side for performing zero point reset after attaching the seat 12.

An operation panel 32 for performing such functions as instructing zero point resetting is connected to the controller 30. Zero point resetting of the occupant detection. ECU 14 is performed by operating the operation panel 32.

Figure 2A:
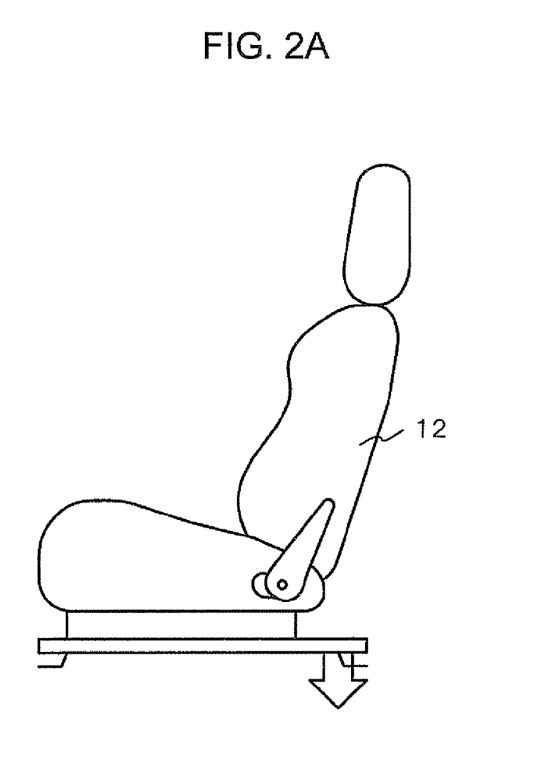
FIG. 2A is a diagram illustrating a seatback angle in an upright state.
Figure 2B:
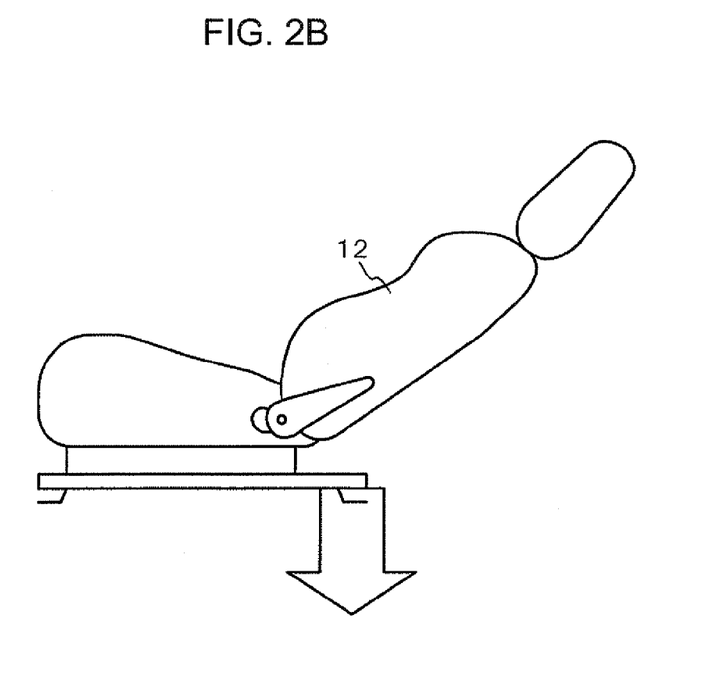
FIG. 2B is a diagram illustrating a seatback angle in a reclined state.

Since the magnitude of the load imparted at the seat cushion rear differs between when the seatback angle is upright as illustrated in FIG. 2A, and when the seatback is reclined as illustrated in FIG. 2B, accurate occupant determination can no longer be performed if zero point resetting is performed when the seatback is in a reclined state such as illustrated in FIG. 2B.

The controller 30 therefore detects the state of the seat 12, and when the state of the seat 12 is a specific state zero point resetting of the load sensors 16 is performed by outputting a reset signal to the occupant detection ECU 14.

Namely, the occupant detection ECU 14 provided to the seat 12, the reclining sensor 22, the slide position sensor 18, and the headrest position sensor 20 are all connected to the controller 30, and connection is achieved by connecting together a vehicle side connector 26 to a factory side connector 28.

Figure 3:
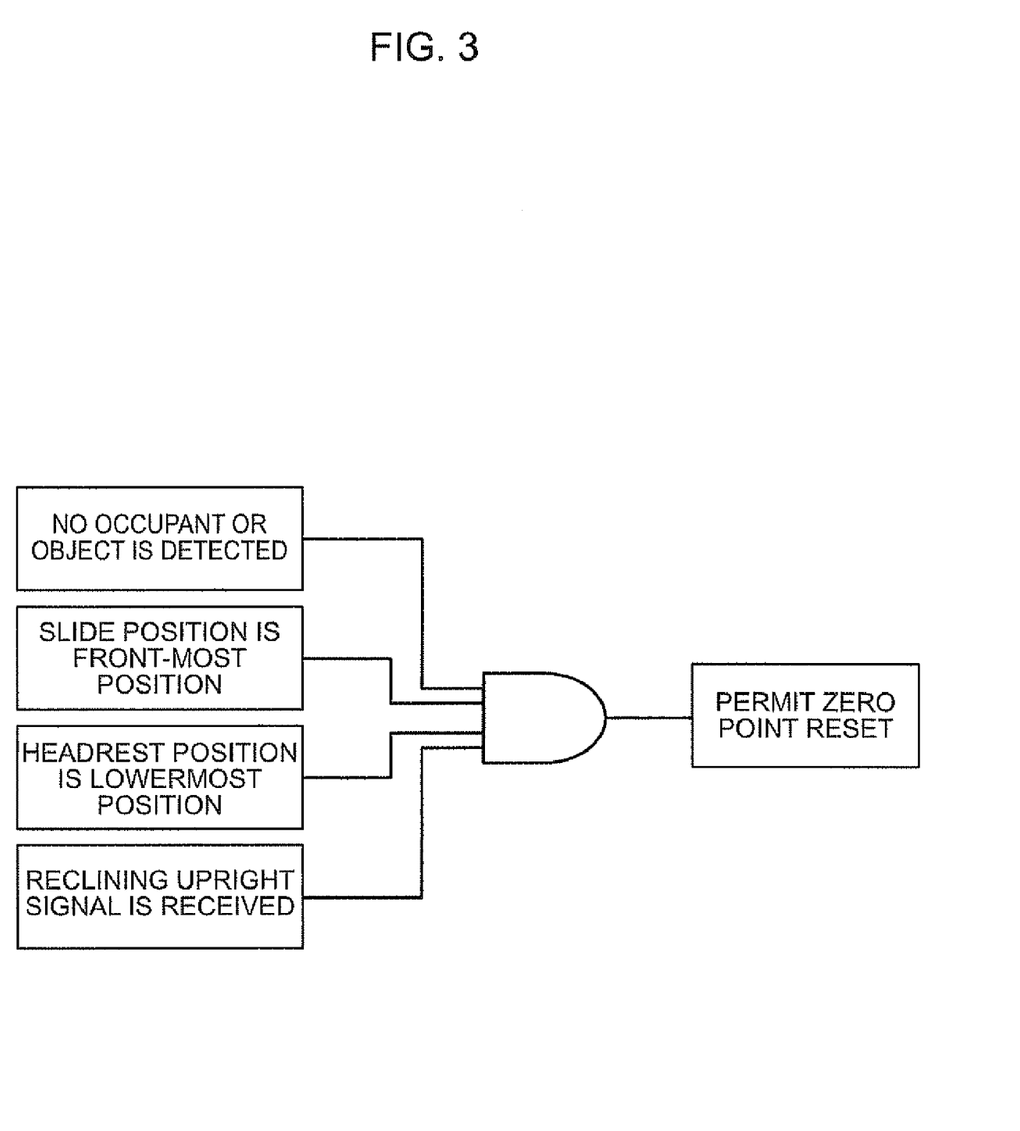
FIG. 3 is an explanatory diagram of conditions for a zero point reset of a load sensor.

Zero point resetting of the load sensors 16 is, specifically, as shown in FIG. 3, performed in the occupant detection ECU 14 by permitting output of a zero point reset signal from the controller 30 to the occupant detection ECU 14 when: no occupant or object is detected by an operative, and also the front-most position is detected by the slide position sensor 18, the lowermost position is detected by the headrest position sensor 20, and a reclining upright signal is received. Namely, the controller 30 acquires detection results of the slide position sensor 18, the headrest position sensor 20 and the reclining sensor 22 through the connector 23, the vehicle side connector 26 and the factory side connector 28. When the controller 30 determines from the acquired detection results of each of the sensors that a specific state of the seat exists (the slide position is at the front-most position, the headrest is in its lowermost position, and the reclining upright state exists), the controller 30 outputs a signal to the occupant detection ECU 14 to cause zero point resetting to be performed on the load sensors 16. When this signal is received from the controller 30 the occupant detection ECU 14 sets the detected values of the load sensors 16 as the zero point by resetting the signals currently being output from the load sensors 16 to zero.

Figure 4:
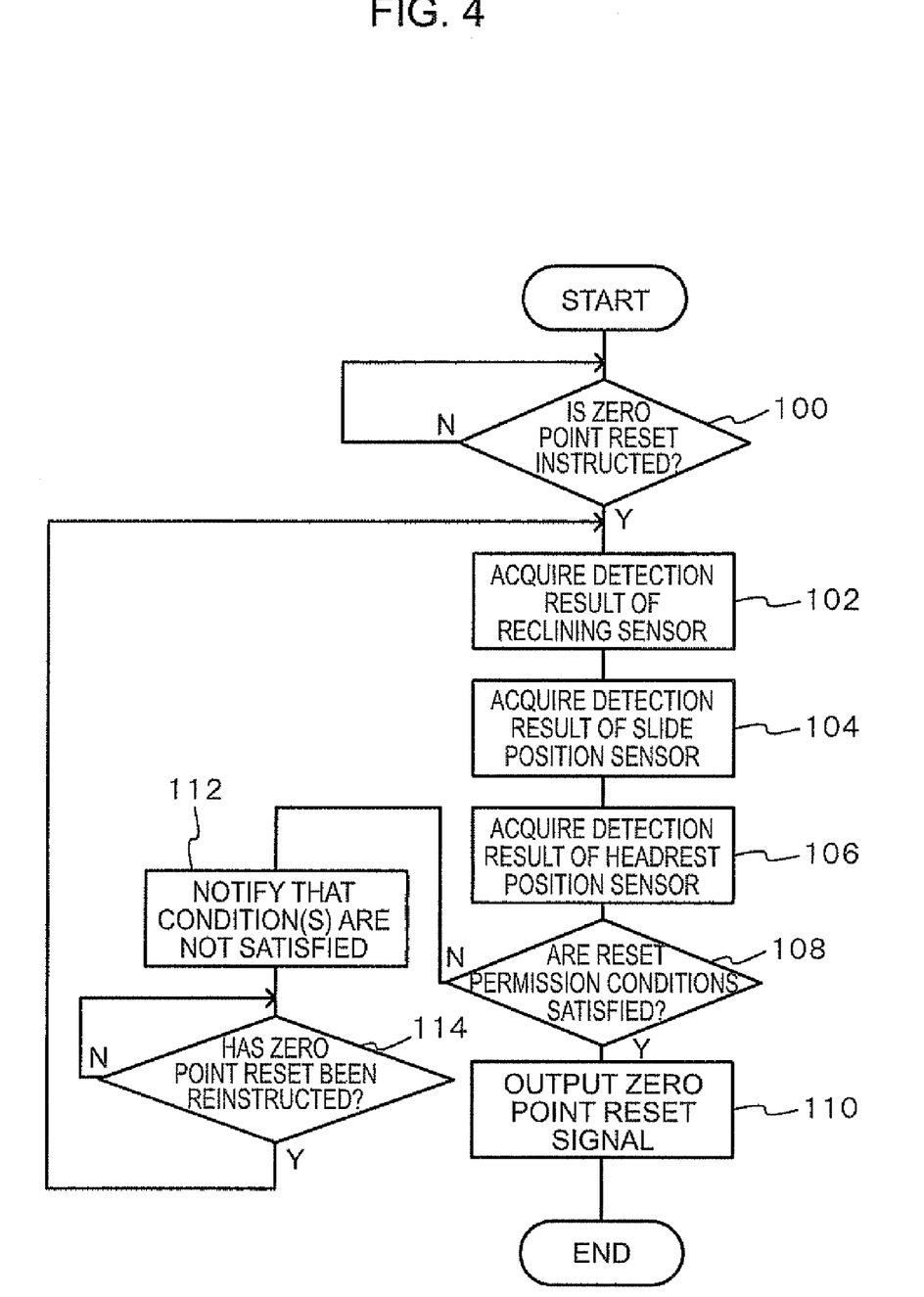
FIG. 4 is a flow chart illustrating an example of flow of processing performed by a controller on the factory side in an occupant detection correction system according to a first exemplary embodiment of the present exemplary embodiment.

Explanation follows regarding specific processing performed by the occupant detection ECU 14 for zero point resetting of the load sensors 16 in the occupant detection correction system 10 according to the first exemplary embodiment configured as described above. FIG. 4 is a flow chart illustrating an example of flow of processing performed by a controller 30 on the factory side of the occupant detection correction system 10 according to the first exemplary embodiment of the present invention. Explanation will be provided assuming that the processing of FIG. 4 is initiated when the vehicle side connector 26 and the factory side connector 28 are connected together.

When the vehicle side connector 26 and the factory side connector 28 are connected together by a factory operative, the controller 30 determines at step 100 whether or not a zero point reset instruction has been given. This determination is made on whether or not the operation panel 32 connected to the controller 30 has been operated by an operative and zero point reset of the load sensors 16 instructed. Standby is maintained until affirmative determination is made and then processing proceeds to step 102.

At step 102, the detection result of the reclining sensor 22 is acquired and processing proceeds to step 104. Namely, the detection result of the reclining sensor 22 is imported into the controller 30 through the connector 23, the vehicle side connector 26 and the factory side connector 28.

The detection result of the slide position sensor 18 is acquired at step 104 and processing proceeds to step 106. Namely, the detection result of the slide position sensor 18 is imported into the controller 30 through the connector 23, the vehicle side connector 26 and the factory side connector 28.

The detection result of the headrest position sensor 20 is acquired at step 106 and processing proceeds to step 108. Namely, the detection result of the headrest position sensor 20 is imported into the controller 30 through the connector 23, the vehicle side connector 26 and the factory side connector 28. The processing sequence of steps 102 to 106 is not limited thereto and processing may be performed in any order.

At step 108, the controller 30 determines whether or not reset conditions have been satisfied. This determination is made on whether or not the detection result of the slide position sensor 18 indicates the front-most position, and the detection result of the headrest position sensor 20 indicates the lowermost position, and the detection result of the reclining sensor 22 indicates the reclining upright state. When this detection is negative processing proceeds to step 112 and when determination is affirmative processing proceeds to step 110. Explanation follows regarding an example in which, of the determination conditions illustrated in FIG. 3, it is assumed at this stage of processing that there is no occupant or object in the seat 12 since determination of whether or not there is an occupant or object in the seat 12 is performed by the operative checking the seat 12 before performing zero point resetting instruction.

At step 110, a zero point reset signal is output to the occupant detection ECU 14 through the factory side connector 28, the vehicle side connector 26 and the connector 23, thereby completing a cycle of processing of the controller 30. The current values being detected by the load sensors 16 are accordingly reset to zero in the occupant detection ECU 14 according to the zero point reset signal output from the controller 30.

On the other hand, at step 112, notification indicating that the conditions have not been satisfied is made, and processing proceeds to step 114. Namely, notification is made to indicate that one of the detection results from each of the sensors does not satisfy the reset conditions, such as by notification with a lamp or by voice or other noise output.

Determination is made by the controller 30 at step 114 as to whether or not zero point resetting has been reinstructed. This determination is made by determining whether or not zero point reset instruction on the operation panel 32 has been performed again after the operative has performed a check operation according to the information provided at step 112. Standby is maintained until affirmative determination is made, at which point processing proceeds to step 102. The processing described above is then repeated until the determination of step 108 is affirmative.

The values of the load sensors 16 change with the tilt angle of the seatback since the load sensors 16 are provided at two locations to the rear of the seat cushion. Therefore, the present exemplary embodiment enables accurate occupant detection from the values of the load sensors 16 by only permitting a reset instruction to be issued from the controller 30 when a specific state of the seat 12 exists, and the occupant detection ECU 14 performing zero point reset of the values of the load sensors 16 only on such occasions.

Second Exemplary Embodiment

Figure 5:
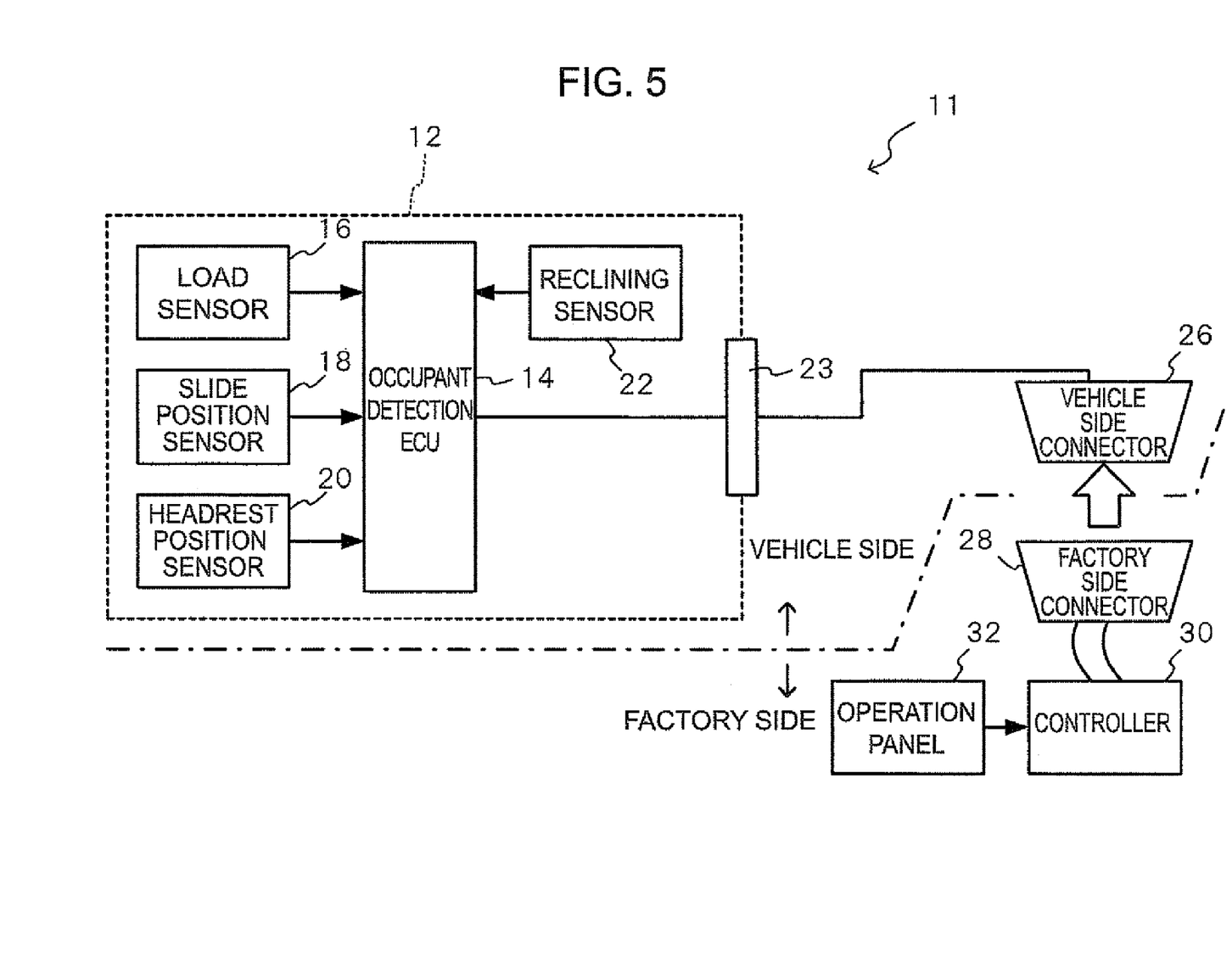
FIG. 5 is a diagram illustrating a schematic configuration of an occupant detection correction system according to a second exemplary embodiment of the present invention.

Explanation follows regarding an occupant detection correction system according to a second exemplary embodiment of the present invention. FIG. 5 is a diagram illustrating a schematic configuration of an occupant detection correction system according to the second exemplary embodiment of the present invention. Portions of the configuration similar to those of the first exemplary embodiment are appended in the explanation with the same reference numerals.

In the first exemplary embodiment a case has been explained in which for outputting a zero point reset signal from the controller 30 on the factory side, the controller 30 outputs the zero point reset signal when the state of a seat has been ascertained and a seat 12 is in a specific state. However, in the second exemplary embodiment a case will be explained in which, after the zero point reset signal has been output from the controller 30 the occupant detection ECU 14 then performs resetting only when a specific occupant detection state has been detected.

The seat 12 is, similarly to the first exemplary embodiment, provided with: load sensors 16 for detecting load provided on the left and right at two locations on the rear side of a seat cushion of the seat 12; a slide position sensor 18 for detecting a seat sliding position; a headrest position sensor 20 for detecting the position of a headrest; and a reclining sensor 22 for detecting a predetermined tilt angle (reclining upright state) in which the seatback is in a upright state.

The occupant detection ECU 14 for performing processing to detect the presence of an seated occupant or an object on the seat 12 is provided at a lower portion of the seat 12. The load sensors 16 are connected to the occupant detection ECU 14. The occupant detection ECU 14 is configured to detect the presence of a seated occupant or an object based on detection results (load signals) of the load sensors 16.

In the first exemplary embodiment explanation has been given of a case in which a detection result of the occupant detection ECU 14 is output to the A/B ECU 24 for controlling the deployment of an airbag. In the second exemplary embodiment explanation is given of a case in which the A/B ECU 24 is omitted, however configuration may be made with the A/B ECU 24 provided similarly to in the first exemplary embodiment.

Similarly to in the first exemplary embodiment a controller 30 is provided on the factory side and an operation panel 32 is connected to the controller 30.

In the present exemplary embodiment the occupant detection ECU 14 determines whether or not to perform zero point resetting of the load sensors 16. Therefore, in addition to the load sensors 16, the slide position sensor 18, the headrest position sensor 20 and the reclining sensor 22 are also connected to the occupant detection ECU 14.

Figure 6:
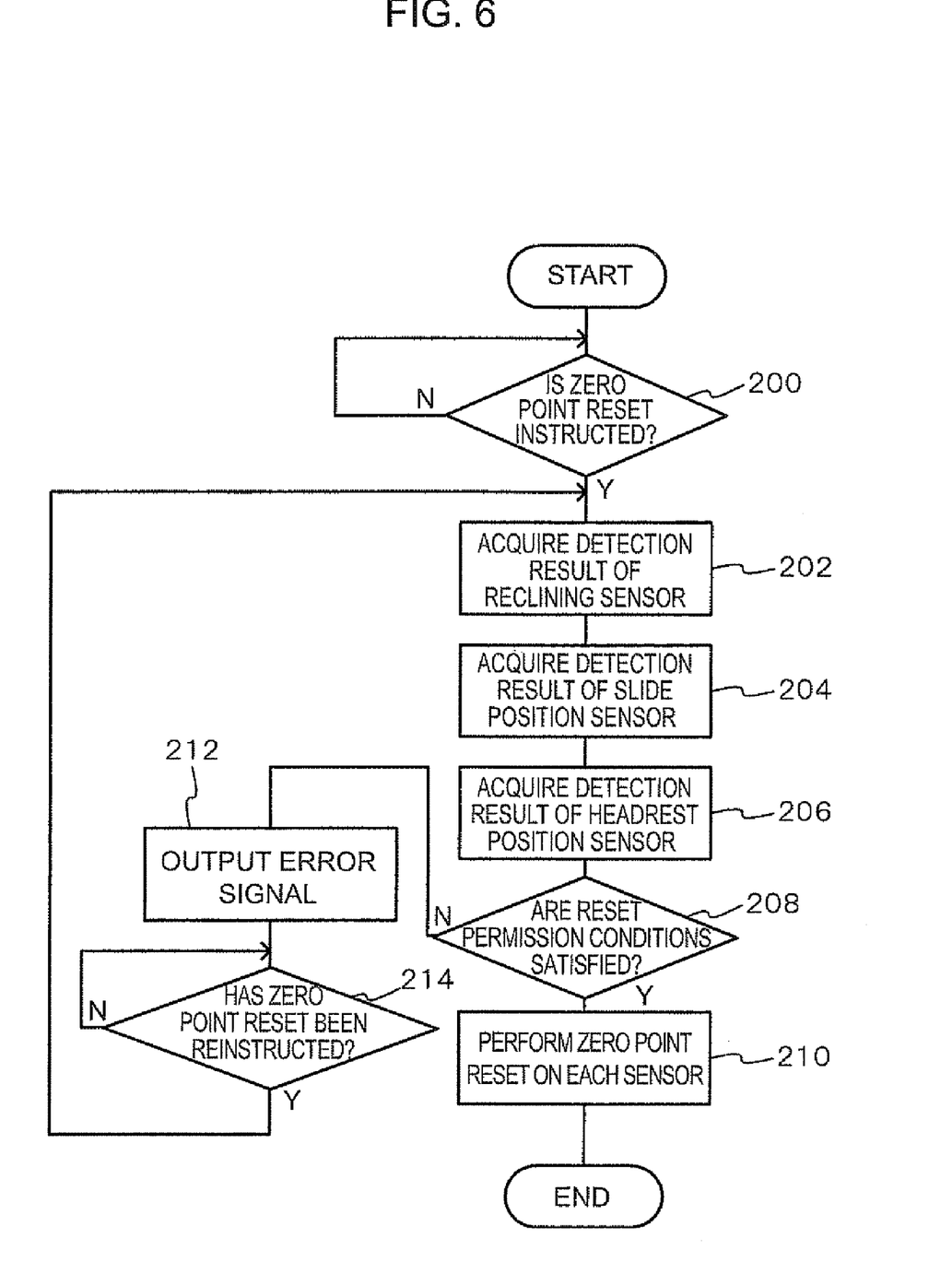
FIG. 6 is a flow chart illustrating an example of flow of processing performed by an occupant detection ECU on the vehicle side of an occupant detection correction system according to the second exemplary embodiment of the present invention.

Namely, when the occupant detection ECU 14 is input with a zero point reset instruction from the controller 30 through the factory side connector 28, the vehicle side connector 26 and the connector 23 through operation of the operation panel 32 by an operative, the occupant detection ECU 14 then determines from the acquired detection results of each of the sensors whether or not a specific state of the seat exists (the slide position is at the front-most position, the headrest is in its lowermost position, and the reclining upright state exists). The occupant detection ECU 14 then only executes zero point reset of the load sensors 16 when the specific state exists, and transmits an error signal back to the controller 30 in other cases, Explanation follows regarding specific processing performed by the occupant detection ECU 14 for zero point resetting of the load sensors 16 in an occupant detection correction system 11 according to the second exemplary embodiment configured as described above. FIG. 6 is a flow chart illustrating an example of flow of processing performed by the occupant detection ECU 14 of the occupant detection correction system 11 according to the second exemplary embodiment of the present invention. Explanation of the processing of FIG. 6 will be provided assuming that the processing is initiated when the vehicle side connector 26 and the factory side connector 28 are connected together.

The occupant detection ECU 14 determines at step 200 whether or not a zero point reset instruction has been input from the controller 30. This determination is made on whether or not a signal representing a zero point reset instruction has been output by an operative operating the operation panel 32 connected to the controller 30 and instructing zero point reset of the load sensors 16. Standby is maintained until affirmative determination is made and then processing proceeds to step 202.

At step 202, the detection result of the reclining sensor 22 is acquired and processing proceeds to step 204. Namely, the detection result of the reclining sensor 22 is imported into occupant detection ECU 14.

The detection result of the slide position sensor 18 is acquired at step 204 and processing proceeds to step 206. Namely, the detection result of the slide position sensor 18 is imported into the occupant detection ECU 14.

The detection result of the headrest position sensor 20 is acquired at step 206 and processing proceeds to step 208. Namely, the detection result of the headrest position sensor 20 is imported into the occupant detection ECU 14. The processing sequence of steps 202 to 206 is not limited thereto and processing may be performed in any order.

At step 208, the occupant detection ECU 14 determines whether or not reset conditions have been satisfied. This determination is a determination as to whether or not the detection result of the slide position sensor 18 indicates the front-most position, and the detection result of the headrest position sensor 20 indicates the lowermost position, and the detection result of the reclining sensor 22 indicates the reclining upright state. When this detection is negative processing proceeds to step 212 and when determination is affirmative processing proceeds to step 210.

At step 210, zero point resetting of the load sensors 16 is executed by the occupant detection ECU 14, thereby completing a cycle of processing of the occupant detection ECU 14. Namely the occupant detection ECU 14 resets the values currently detected by the load sensors 16 to zero.

At step 212, the occupant detection ECU 14 outputs an error signal indicating that reset condition(s) have not been satisfied to the controller 30 and processing proceeds to step 214. Namely, an error signal is output to the controller 30 indicating that one of the detection results of each of the sensors does not satisfy the conditions. The controller 30 is able to notify error contents based on the error signal. As an example of a method for notifying the error, error contents may be displayed, or notification may be by lamps, or output of a voice or other sound.

At step 214, whether or not zero point reset has been reinstructed is determined. This determination is made by determining whether or not a zero point reset instruction has been input to the occupant detection ECU 14 again, by operating the operation panel 32 again after the operative has performed a check operation (such as for example re-checking the state of the seat 12) in response to the error signal output to the controller 30 at step 212. Standby is maintained until affirmative determination is made, at which point processing proceeds to step 202. The processing described above is then repeated until the determination of step 208 is affirmative.

The values of the load sensors 16 change with the tilt angle of the seatback since the load sensors 16 are provided at two locations to the rear of the seat cushion. Therefore, the present exemplary embodiment enables accurate occupant detection from the values of the load sensors 16 by the occupant detection ECU 14 performing zero point reset of the values of the load sensors 16 when the seat 12 is in the specific state.

In each of the exemplary embodiments above the detection results of the slide position sensor 18 and the headrest position sensor 20 are also considered when performing zero point resetting. However since tilting of the seatback has the greatest influence on the load sensors 16 configuration may be made in which the slide position sensor 18 and the headrest position sensor 20 are omitted, and zero point resetting is performed when the reclining upright state is detected by the reclining sensor 22.

Explanation has been given in each of the exemplary embodiments of cases in which resetting of the load signals to a reference point is by resetting to zero, however the reference point is not limited to zero and resetting may be performed to another value than zero.

Explanation has been given in each of the exemplary embodiments of cases in which the controller 30 is provided on the side of a factory. However there is no limitation thereto. The controller 30 may for example be provided in a vehicle repair workshop or dealer. In such cases, application of the controller 30 may be made for example to a self-diagnostic apparatus for connecting to a vehicle and ascertaining self-diagnostic results.

Explanation has been given in each of the exemplary embodiments of cases in which the load sensors 16 are provided at two locations on the rear side of a seat cushion, however similar implementation to that of the above exemplary embodiments may be made to zero point resetting when load sensors 16 are provided to the front and rear at four locations on a seat cushion.

What is claimed is:

1. An occupant detection correction system comprising:
    a load detection section that detects load imparted to a vehicle seat and outputs a load signal representing the load;
    an occupant detection section that detects an occupant based on the load signal and is capable of resetting the load signal to a reference point based on a predetermined reset instruction;
    a tilt angle detection section that detects a predetermined tilt angle of a seatback; and
    a permitting section that permits execution of resetting the load signal to the reference point by the occupant detection section when the predetermined tilt angle is detected by the tilt angle detection section.

2. The occupant detection correction system of claim 1, further comprising:
    a sliding position detection section that detects a sliding position of the vehicle seat; and
    a headrest position detection section that detects a position of a headrest, wherein
    the permitting section permits resetting to the reference point when the state of the vehicle seat is detected to be a specific state based the predetermined tilt angle being detected by the tilt angle detection section, and the detection results of the sliding position detection section and the headrest position detection section.

3. The occupant detection correction system of claim 1, wherein the permitting section is provided separately to a vehicle, and permits execution of resetting to the reference point by outputting a reset instruction to the occupant detection section when the predetermined tilt angle is by the tilt angle detection section.

4. The occupant detection correction system of claim 1, wherein the load detection section is provided at two locations at the vehicle rear-side of the seat cushion and detects load imparted to the rear side of the vehicle seat.

* * * * *